United States Patent [19]
Katsuzawa et al.

[11] Patent Number: 5,967,716
[45] Date of Patent: Oct. 19, 1999

[54] COOLANT FEEDER

[75] Inventors: Yukio Katsuzawa; Yoshinobu Maeda, both of Minamitsuru-gun; Yasuyuki Nakazawa, Fujiyoshida, all of Japan

[73] Assignee: Fanuc Ltd., Yamanashi, Japan

[21] Appl. No.: 09/215,240

[22] Filed: Dec. 18, 1998

[30] Foreign Application Priority Data

Dec. 18, 1997 [JP] Japan .................................. 9-363848

[51] Int. Cl.$^6$ .................................................... B23C 11/10
[52] U.S. Cl. ................................ 409/134; 408/8; 408/56; 409/136
[58] Field of Search ................................ 408/8, 56, 57; 409/134, 135, 136, 231

[56] References Cited

U.S. PATENT DOCUMENTS 5,072,948  12/1991  Kostrzewski .......................... 409/135

Primary Examiner—Daniel W. Howell
Attorney, Agent, or Firm—Staas & Halsey

[57] ABSTRACT

A spindle protective structure capable of reliably detecting coolant leakage from a jointing device and protecting a spindle. A flow sensor is provided in the line of a drain pipe for discharging coolant leaking from the rotary joint, so that an alarm is made when the flow of coolant in the drain pipe exceeds a predetermined value. Since the coolant leaking from the jointing device is detected directly and an alarm is outputted, coolant leakage can be found out more quickly than by observing visually whether the flow of coolant jetting from a tip of a tool is normal or not.

2 Claims, 6 Drawing Sheets

COOLANT FEEDER

BACKGROUND OF THE INVENTION

1. Field of the Invention

The present invention relates to a spindle protective structure in a spindle-through coolant feeder.

2. Description of Related Art

As a spindle structure used in a high-speed rotating machine tool such as a drilling machine and a tapping machine, or a machining center, there is known a spindle-through coolant feeder for flowing machining fluid for cooling and removing dust though an axial center of a spindle.

FIGS. 5 and 6 are schematic sectional views of conventional spindle structures using spindle-through coolant.

In the spindle structure of FIG. 6, an axial through hole 2 is bored through a spindle 1 and a pipe 4 is connected to an end of the spindle 1 through a rotary joint 3 so that coolant from the pipe 4 is led through the rotary joint 3 and the though hole 2 to a tip of a tool 5. A drain pipe 6 is provided at the rotary joint 3 in order to discharge coolant overflowing in the rotary joint 3 to the outside.

Such structure is not free from problems such as power loss and oscillation of the spindle 1, since the spindle 1 is driven by an induction motor 8 through a gear train 7, a belt or the like. Therefore, it is not necessarily suitable for real high-speed rotation.

In order to solve the above problems, a spindle structure shown in FIG. 5 has been proposed. In this structure, in addition to a though hole 2 bored through a spindle 1, an axial through hole 10 is bored through a rotor shaft of an induction motor 8. The spindle 1 and the rotor shaft 9 are coupled by a coupler 11, and coolant from a pipe 4 is led through a rotary joint 3 which is fitted to a rotary joint support housing 12 provided at an end of the induction motor 8 and then through the through hole 10 and the through hole 2 to a tip of a tool 5. Since the spindle 1 is driven by the induction motor 5 directly, the structure is free from problems such as power loss and oscillation of the spindle 1, and suitable for real high-speed rotation. A drain pipe 6 is provided at the rotary joint support housing 12 in order to discharge coolant overflowing in the rotary joint 3 to the outside.

In recent spindle-through coolant feeders, coolant of high pressure such as 70 atm. is generally used in order to raise the efficiency of discharging dust and cooling a knife edge of a tool 5 and to improve a finished state of a workpiece. Therefore, if a flaw is made at a rotary joint 3, there is a risk that a large amount of coolant may leak out in a moment. In the case of the structure of FIG. 6, coolant may reach the periphery of the spindle 1, and in the case of the structure of FIG. 5, coolant may flow directly inside the induction motor 8. In either case, it may cause serious problems such as rust, abnormal rotation, or electrical failure. Further, if coolant is not fed to the tip of a tool 5 normally, the tool 5 or a workpiece may be damaged.

Conventionally, flow control of coolant is performed checking the flow of coolant jetting from the tip of a tool 5 by visual observation, or performed depending on a flow sensor provided in the line of a pipe 4 for feeding coolant. In such conventional flow control, leakage of coolant around a rotary joint 3 cannot be detected directly, so that it takes time for an operator to deal with the leakage. Therefore, the conventional flow control is not enough to solve the above mentioned problems related to recent use of high pressure coolant.

SUMMARY OF THE INVENTION

An object of the present invention is to provide spindle protective structure using spindle-through coolant, which is capable of reliably detecting leakage of coolant from a rotary joint to protect a spindle.

A spindle protective structure of the present invention comprises: jointing device for feeding coolant to a spindle; a drain pipe for discharging coolant leaked from the jointing device; and a flow sensor provided in a line of the drain pipe for detecting a flow of coolant flowing through the drain pipe, and an alarm is made when the flow sensor detects a flow of coolant exceeding a predetermined value.

A spindle protective structure of the present invention may comprise a jointing device support housing for supporting the jointing device. The jointing device includes a rotary member and a stationary member, the rotary member is provided within the jointing device support housing, and the drain pipe is connected to the jointing device support housing. A plurality of cutouts are formed on the circumferential wall of the jointing device support housing at a position closer to a spindle than to a position where the drain pipe is connected to the jointing device support housing, so that leaked coolant is discharged through the cutouts. Thus, coolant which has leaked out before supply of coolant is stopped is prevented from flowing to the periphery of a spindle or flowing into an induction motor, and protection of spindle structure is made more reliable.

DETAILED DESCRIPTION OF THE PREFERRED EMBODIMENTS

Figure 1:
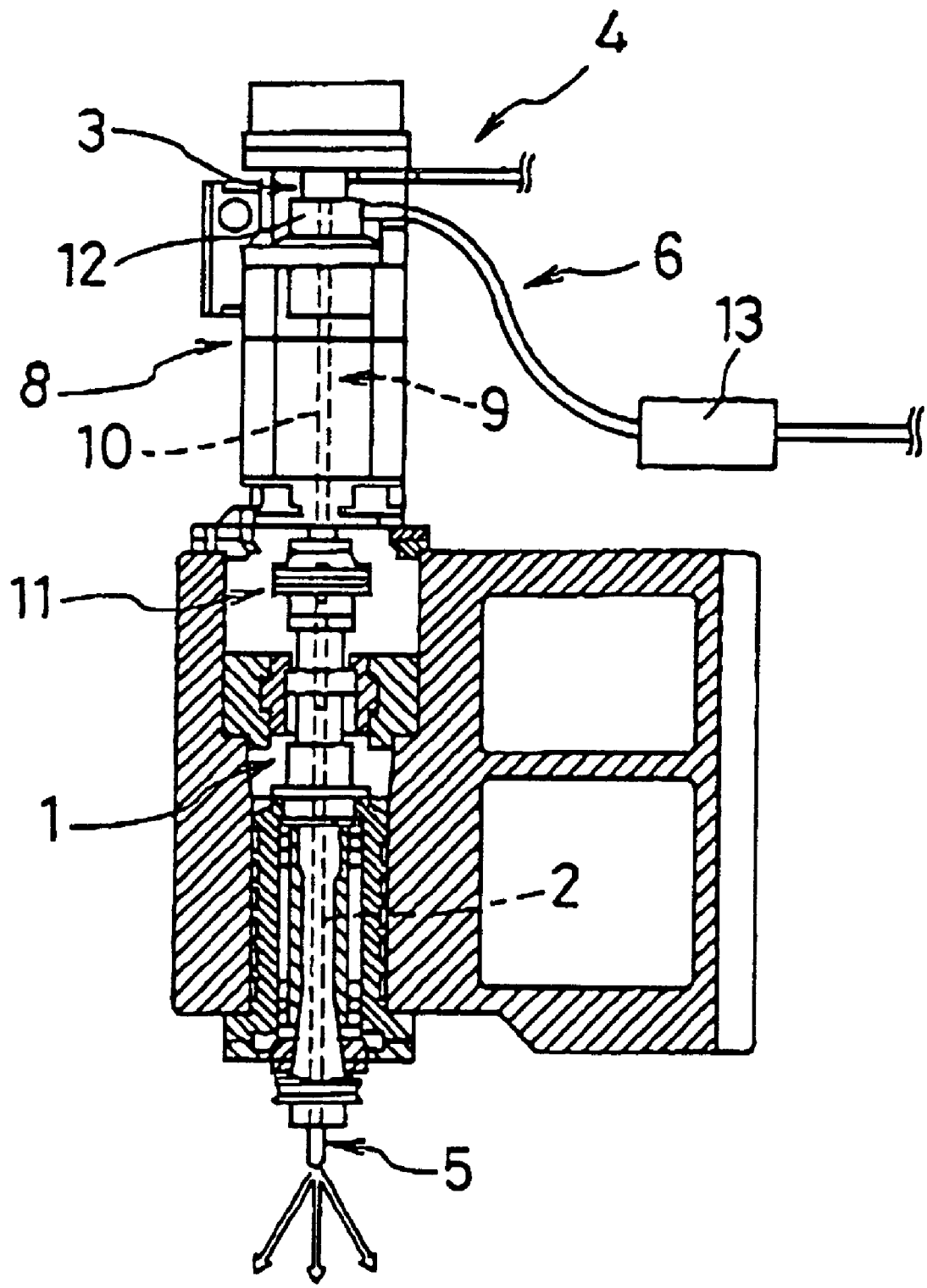
FIG. 1 is a sectional view of an embodiment where the present invention is applied to spindle structure arranged such that a spindle is driven to rotate by an induction motor whose rotor shaft is directly connected to the spindle.

FIG. 1 shows an embodiment where the present invention is applied to spindle structure arranged such that a spindle 1 is driven to rotate by an induction motor 8 whose rotor shaft 9 is directly connected to the spindle 1.

Figure 5:
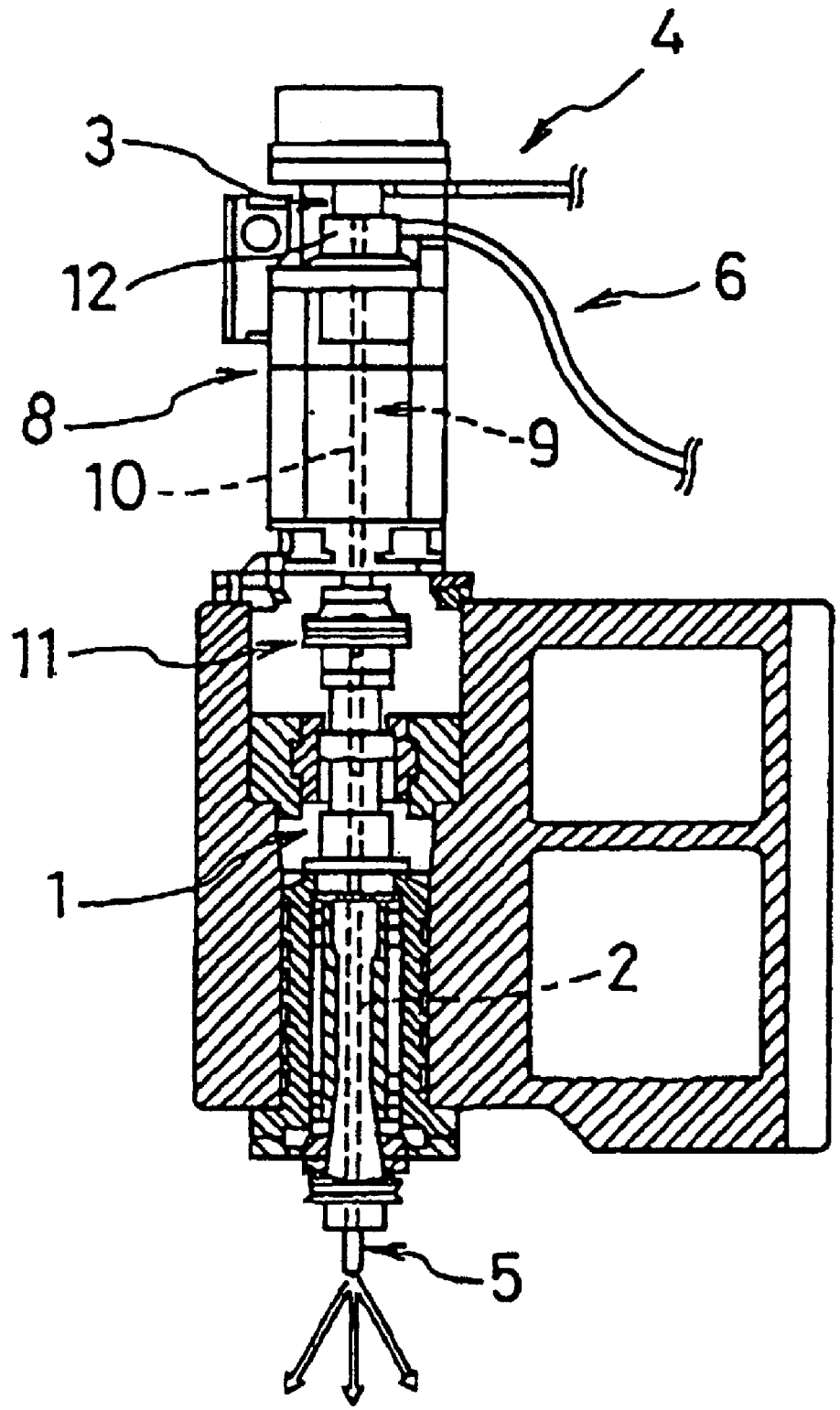
FIG. 5 is a sectional view of an example of spindle structure in a conventional spindle-through coolant feeder.
Figure 6:
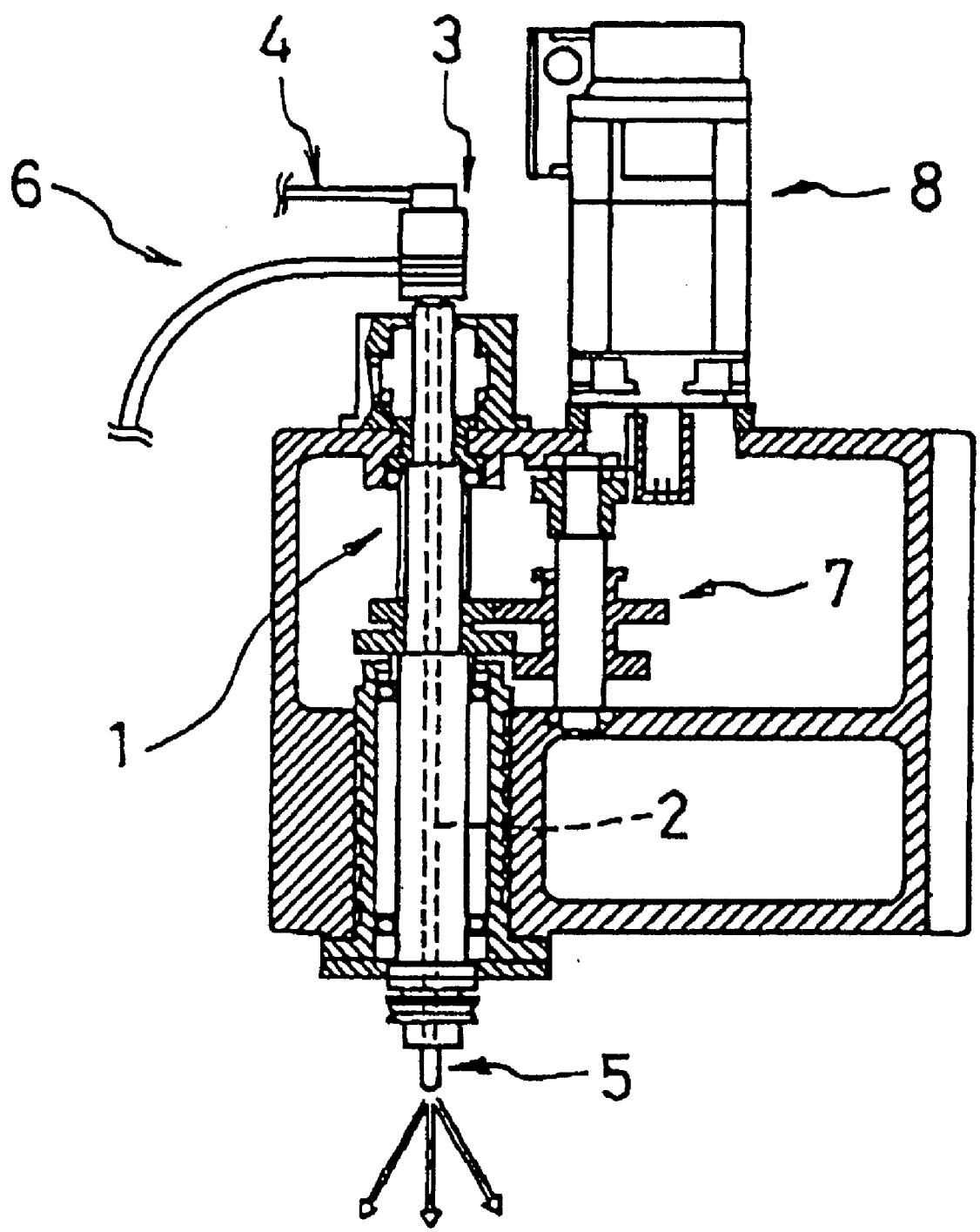
FIG. 6 is a sectional view of another example of spindle structure in a conventional spindle-through coolant feeder.

The embodiment does not differ from the conventional example shown in FIG. 5 in the main part of spindle structure composed of a spindle 1, an induction motor 8, a coupler 11 and the like. The difference is that a flow sensor 13 is provided in the line of a drain pipe 6, and that a plurality of cutouts for discharging coolant are provided at a rotary joint support housing 12 in its region closer to the spindle 1 than to the position where the drain pipe 6 is connected to the rotary joint support housing 12.

Figure 3A:
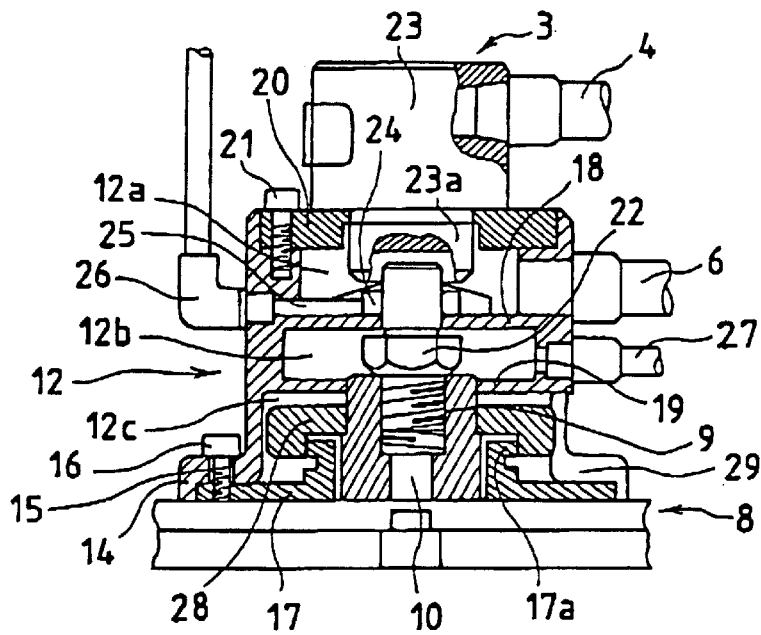
FIGS. 3a, 3b, and 3c are illustrations showing a main part of fitting structure for fitting a rotary joint support housing and a rotary joint to an induction motor.
Figure 3B:
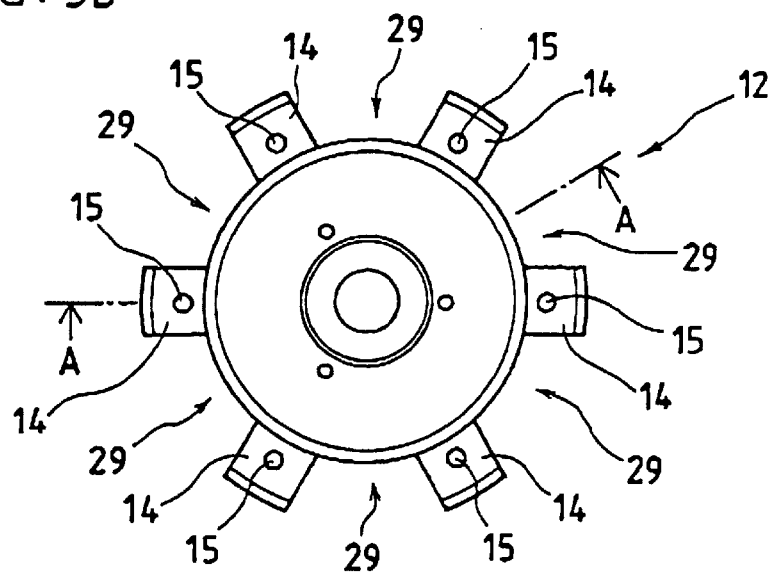
Figure 3C:
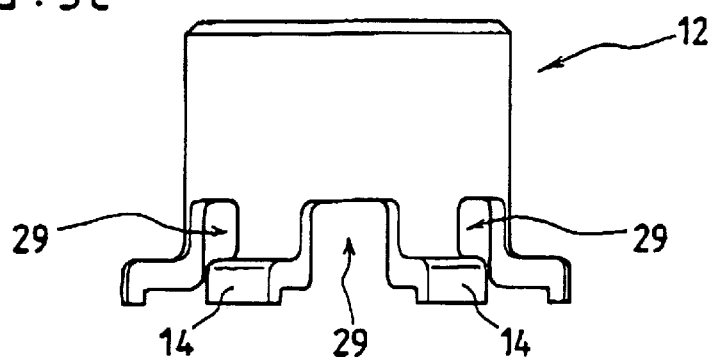

FIG. 3a is a sectional view (A—A section as indicated in FIG. 3b) of a main part of fitting structure for fitting a rotary joint support housing 12 and a rotary joint 3 to an induction motor 8, FIG. 3b a plan view showing the shape of the rotary joint support housing 12 as it is detached, and FIG. 3c a front view showing the shape of the rotary joint support housing 12.

As shown in FIGS. 3b and 3c, the rotary joint support housing 12 is a cylindrical body having a flange 14 around its lower end. The rotary joint support housing 12 is fixed integrally to the upper end face of the induction motor 8 by screws 16 which are led though holes 15 provided at the flange 14. The induction motor 8 and the rotary joint support housing 12 are aligned by engagement of the flange 14 and a spigot 17 provided on the upper end face of the induction motor 8 with the outer circumferential face of the spigot 17 abutting on the inner circumferential face of the flange 14.

As shown in FIG. 3a, the inside of the rotary joint support housing 12 is vertically divided into three air chambers 12a, 12b, 12c by partitions 18, 19, and a lid 20 is fixed to the upper end face of the rotary joint support housing 12 by a plurality of screws 21.

The rotary joint 3 is composed of a nipple-like rotary side member 22 which is set on the rotor shaft 9 side and rotates integrally with the rotary shaft 9, and a stationary side member 23 which is fixed integrally to the housing 12 on the lid 20 side. A through hole 10 of the rotor shaft 10 is provided with a tapered pipe thread at its end portion, and the rotary side member 22 is screwed in the rotor shaft 9 and thereby fixed integrally to the rotor shaft 9. The stationary side member 23 has a socket portion 23a which is to be brought into slidable contact with the rotary side member 22, and is fixed on the upper face of the lid 20 by screws (not shown) or the like, with its socket portion 23a projecting from the central portion of the lid 20 into the air chamber 12a.

A pipe 4 for feeding coolant is connected to the side of the stationary side member 23. Coolant from the pipe 4 flows through a duct in the stationary side member 23 to the socket portion 23a, and then through the rotary side member 22 which is in slidable contact with the socket portion 23a into the through hole 10 of the rotor shaft 9.

With his arrangement some leakage of coolant at the slidable contact portion of the socket portion 23a and the rotary side member 22 is unavoidable. Therefore, a drain pipe 6 is connected to the side of the air chamber 12a in order to discharge the coolant flowing from the slidable contact portion of the socket portion 23a and the rotary side member 22 to the outside.

The partition 18 is so formed that the central portion thereof, where the cylindrical portion of the rotary side member 22 passes through the partition 18, has an upper surface of a low conical shape. With this formation, coolant which has leaked out is guided to the peripheral portion of the air chamber 12a and easily discharged through the drain pipe 6. Further, a circumferential groove 24 is provided on the circumferential face of the through hole of the partition 18 with which the circumferential face of the cylindrical portion of the rotary side member 22 is in slidable contact. A small hole 25 extending from the circumferential groove 24 to the outer circumferential face of the housing 12 is bored through the partition 18 in the radial direction, and an air purge pipe 26 is connected to the small hole 25. Through the air purge pipe 26, compressed air or the like is externally fed to the air chamber 12a to raise the pressure in the air chamber 12a. Thus, the coolant which has leaked into the air chamber 12a can be reliably discharged through the drain pipe 6 to the outside.

However, in the case where coolant of high pressure such as 70 atm. is used, if a serious flaw is made at the slidable contact portion of the stationary side member 23 and the rotary side member 22, there is a risk that discharge through the drain pipe 6 may be not enough to deal with leak coolant, and that coolant which has leaked into the air chamber 12a may flow from between the though hole at the center of the partition 18 and the cylindrical portion of the rotary side member 22 into the air chamber 12b.

Considering the above risk, the present embodiment has a flow sensor 13 provided in the line of the drain pipe 6 as shown in FIG. 1. If the flow of coolant in the drain pipe 6 exceeds a predetermined value, an alarm is outputted to ring an alarm bell or to indicate abnormality on a monitor of a numerical control unit for drive control of a machine tool or a machining center so that an operator may quickly take measures against coolant leakage.

It is also conceivable to stop a coolant feed pump based on the alarm signal. However, it is dangerous to stop feed of coolant immediately, when cutting work is going on with high speed rotation. Therefore, in order to stop the coolant feed pump based on the alarm signal, steps such as moving the spindle away from a workpiece needs to be taken before feed of coolant is stopped, and therefore, an appropriate program for an urgency stop, that is, a program specifying that when an alarm is detected, feed of coolant is stopped after a spindle or a workpiece is removed for safety needs to be stored in advance in a numerical control unit for drive control of a machine tool or a machining center.

The flow sensor 13 may be either a pressure type flow sensor or a float type flow sensor. An alarm output level of the floe sensor 13 is determined based on the flow of coolant normally leaking at the slidable contact portion of the stationary side member 23 and the rotary side member 22. Specifically, the alarm output level is so determined that an alarm may be outputted when an actual flow of coolant in the drain pipe 6 exceeds a flow of coolant therein in the case of normal leakage in some degree.

Further, in case discharging in the air chamber 12a is not enough to deal with leak coolant and coolant flows into the air chamber 12b, an auxiliary drain pipe 27 is provided at the side of the air chamber 12b. Though leakage of coolant may occur due to degradation of sealant applied to the engaging portion of the rotary side member 22 and the tapered pipe thread of the through hole 10, the amount of such leakage is small. Therefore, the auxiliary drain pipe 27 may have a diameter smaller than that of the drain pipe 6.

Further, in case discharging in the air chamber 12b is not enough to deal with leak coolant and coolant flows into the air chamber 12c, a fringer 28 is provided between the outer circumferential face of the rotor shaft 9 and the inner circumferential face of the housing 12 to prevent coolant from flowing from a gap between the rotor shaft 9 and the circumferential face of a through hole of the spigot 17 into the induction motor 8. The finger 28 is a rotating part fixed integrally to the rotor shaft 9, and has a function of splashing dust and water radially outward by centrifugal force of rotation.

Since a plurality of cutouts 29 are provided at the lower end portion of the circumferential wall of the housing 12 as shown in FIGS. 3b and 3c, leak coolant splashed by the fringer 28 is discharged from the housing 12 to the outside through the cutouts 29.

The central portion 17a of the spigot 17 through which the rotor shaft 9 passes is formed to have a relatively large height, and closely fitted in the cylindrical folded portion provided at the lower face of the fringer 28. Therefore, coolant flowing down the fringer 28 is prevented from flowing from between the spigot 17 and the fringer 28 into the induction motor 8.

If a serious flaw is made at the slidable contact portion of the stationary side member 23 and the rotary side member 22, a large amount of coolant leaks therefrom, and coolant reaches the air chamber 12c, the leak coolant is finally discharged through the cutouts 29 of the housing 12 directly to the outside and flows down the outer circumferential face of the induction motor 8. It is far less harmful than coolant's flowing directly into the induction motor 8.

If a serious flaw is made at the slidable contact portion of the stationary side member 23 and the rotary side member 22, the flow sensor 13 will detect excessive flow and immediately outputs an alarm to inform an operator. Further, even if discharging in the air chamber 12a is not enough to deal with leak coolant and leak coolant flows into the air chamber 12b, a certain amount of excessive flow can be discharged through the auxiliary drain pipe 27 provided at the air chamber 12b. Finally, if leak coolant flows into the air chamber 12c, it is discharged through the cutouts 29 of the housing 12 directly to the outside.

Since there is enough time after the flow sensor 13 outputs an alarm until leak coolant flows into the air chamber 12c to be discharged directly to the outside, an operator who has become aware of the alarm can have time to remove a machine tool for safety, to stop feed of coolant, and further, if necessary, to wipe leak coolant discharged through the cutouts of the housing 12 to the outside with waste cloth or to prevent the flow of the leak coolant by waste cloth. Thus, even if a flaw is made at the slidable contact portion of the rotary joint 3 when high pressure coolant is being used, the induction motor 8 and a main part of the spindle structure can be protected from being damaged.

Figure 4:
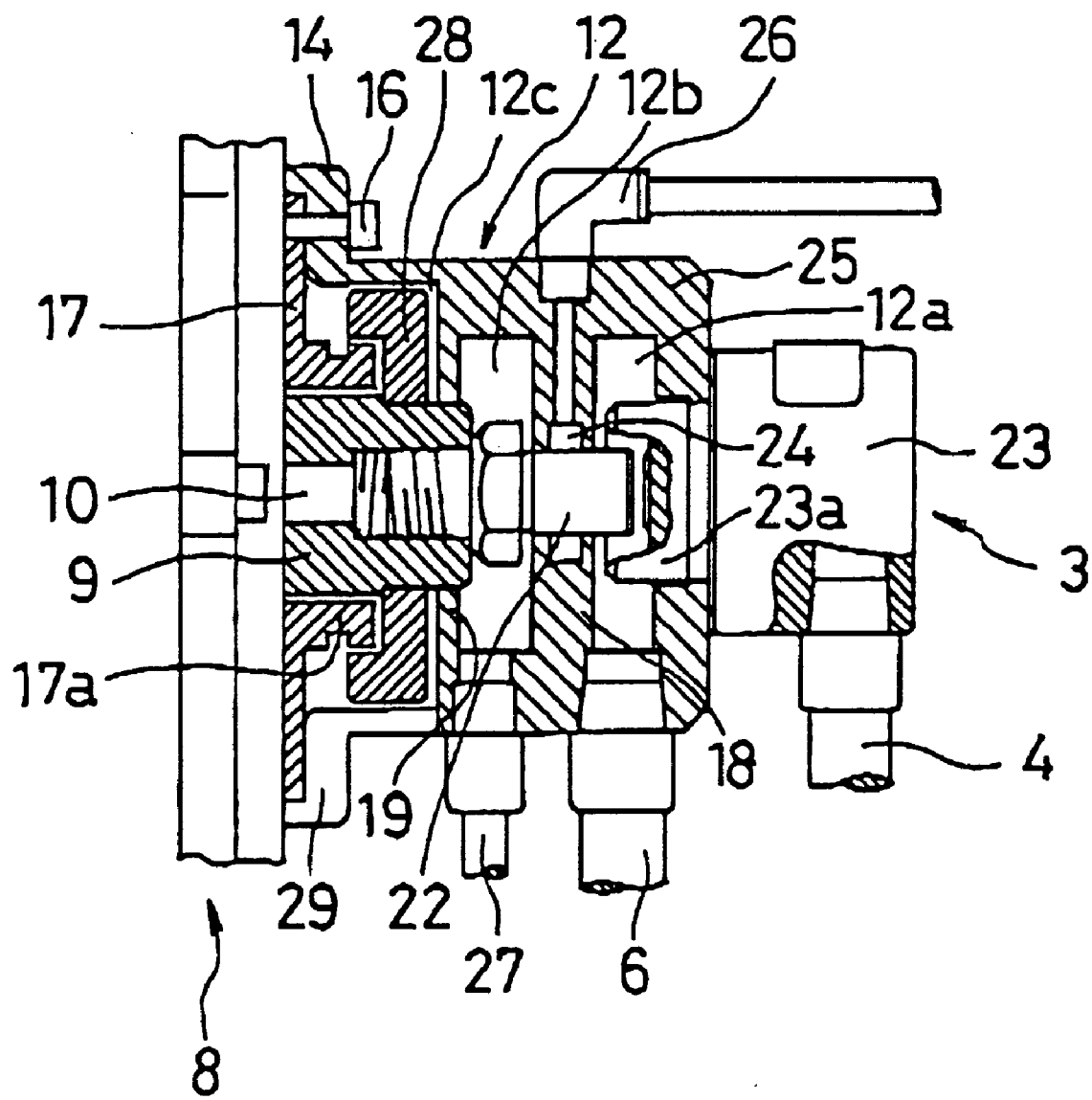
FIG. 4 is a sectional view of an embodiment where the present invention is applied to a machine tool or a machining center having a spindle arranged in the horizontal direction.

FIG. 4 is a sectional view of an embodiment where the present invention is applied to a machine tool or a machining center with a spindle 1 extending in the horizontal direction. Fitting structure for fitting a rotary joint support housing 12 and a rotary joint 3 to an induction motor 8 is the same as that in the embodiment of FIG. 3.

In the embodiment shown in FIG. 4, coolant overflowing an air chamber 12a is led to a drain pipe 6 side of a housing 12 by self-weight. Therefore, a partition 18 does not need to have a conical face. As shown in FIG. 4, a drain pipe 6, an auxiliary drain pipe 27 and a cutout 29 need to be provided on the lower side of the housing 12 as it is fitted to the induction motor 8. Same as the preceding embodiment, a flow sensor 13 is provided in the line of the drain pipe 6 so as to detect an increase in leak coolant in the air chamber 12a to output an alarm.

Figure 2:
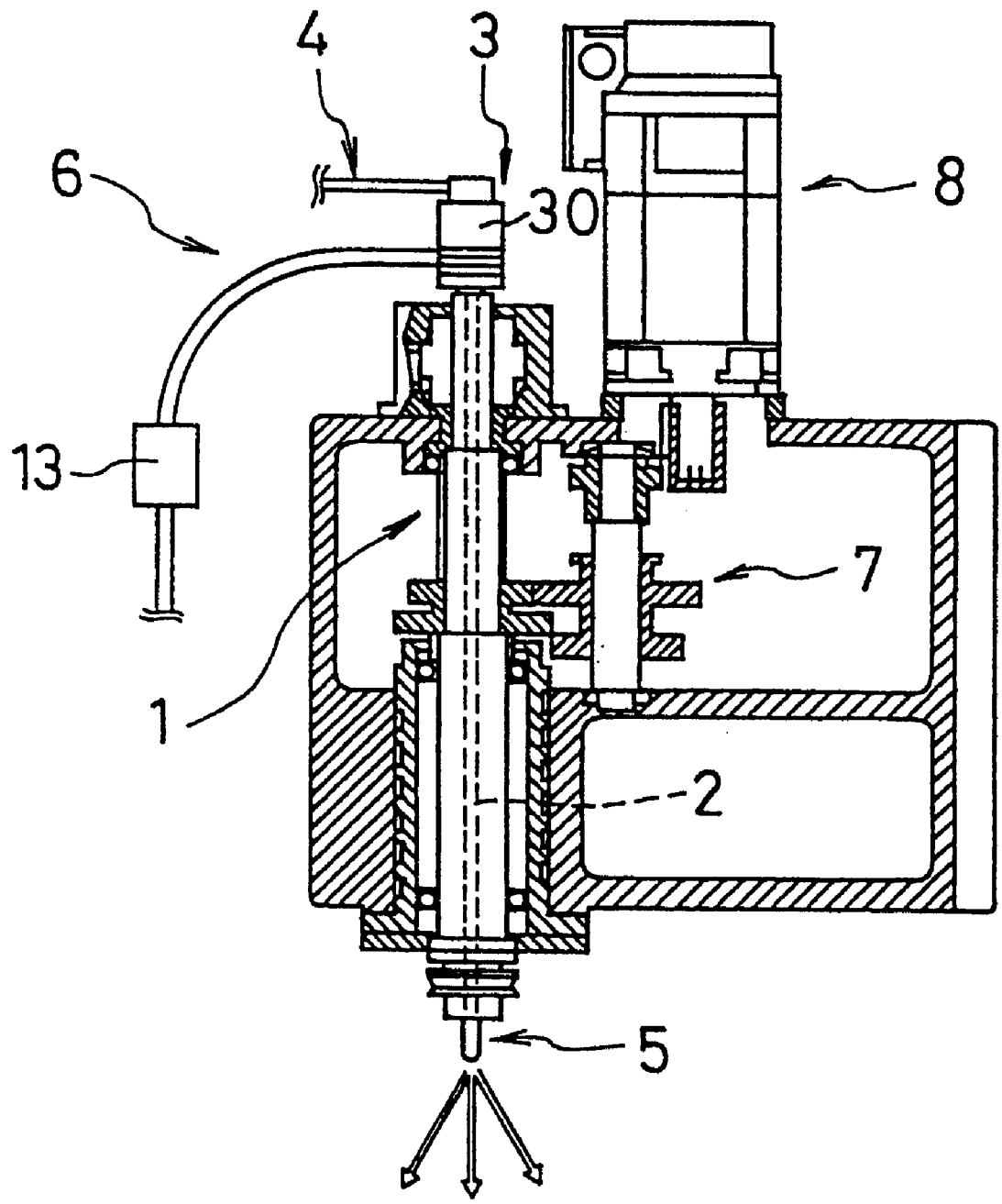
FIG. 2 is a sectional view of an embodiment where the present invention is applied to spindle structure arranged such that a spindle is driven to rotate, indirectly by an induction motor.

In the case of the arrangement such that a spindle 1 is driven to rotate by an induction motor 8 placed apart from the spindle 1 through a gear train 7 as shown in FIG. 2, if a rotary joint 3 integrally formed by uniting a stationary side member and a rotary side member is fitted directly to an end of the spindle 1, a drain pipe 6 is provided at a housing 30 which is a casing for the rotary joint 3 to discharge coolant leaking from a slidably rotating portion thereof, and a flow sensor 13 is provided in the line of the drain pipe 6 to detect an increase in leak coolant in the housing 30 to output an alarm.

According to the present invention, a flow sensor provided in the line of a drain pipe directly detects an increase in leakage of coolant at the joint portion of a rotary joint and outputs an alarm. Therefore, even if abnormal coolant leakage occurs due to an abnormal state of the rotary joint, an operator can quickly take measures against the leakage and prevent a harmful influence on an induction motor, spindle structure, a workpiece and the like.

Further, a drain pipe is connected to a rotary joint support housing provided to contain a rotary portion of the rotary joint, and in addition, a plurality of cutouts are provided at the circumferential wall of the rotary joint support housing in its region closer to the spindle than to the position at which the drain pipe is connected to the rotary joint support housing so that leak coolant may be discharged through the cutouts. Therefore, even if discharging through the drain pipe is not enough to cope with leak coolant, leak coolant flowing from the rotary joint is discharged through the cutouts of the housing directly to the outside and prevented from flowing into the induction motor or the spindle structure.

What is claimed is:

1. A spindle protective structure in a spindle-through coolant feeder, comprising:

a jointing device for feeding coolant to a spindle;

a drain pipe for discharging coolant leaked from said jointing device; and a flow sensor provided in a line of said drain pipe, for detecting a flow of coolant flowing through said drain pipe, wherein an alarm is made when a flow of coolant exceeding a predetermined value is detected by said flow sensor.

2. A spindle protective structure in a spindle-through coolant feeder according to claim 1, further comprising a jointing device support housing for supporting said jointing device, wherein said jointing device includes a rotary member and a stationary member, said rotary member is provided within said jointing device support housing, said drain pipe is connected to said jointing device support housing, and a plurality of cutouts are formed on a circumferential wall of said jointing device support housing at a portion closer to a spindle than to a position where said drain pipe is connected to said jointing device support housing, so that the leaked coolant is discharged through said cutouts.

* * * * *